United States Patent
Stolz (10) Patent No.: US 10,030,693 B2
(45) Date of Patent: Jul. 24, 2018

(54) PIN AND RETAINER LOCKING SYSTEM

(71) Applicant: CATERPILLAR INC., Peoria, IL (US)

(72) Inventor: Michael Robert Stolz, Franklin, WI (US)

(73) Assignee: Caterpillar Inc., Deerfield, IL (US)

( * ) Notice: Subject to any disclaimer, the term of this patent is extended or adjusted under 35 U.S.C. 154(b) by 521 days.

(21) Appl. No.: 14/722,054

(22) Filed: May 26, 2015

(65) Prior Publication Data

US 2016/0348712 A1    Dec. 1, 2016

(51) Int. Cl.
| | | |
|---|---|---|
| *F16C 11/10* | (2006.01) | |
| *E02F 3/48* | (2006.01) | |
| *F16C 11/04* | (2006.01) | |
| *E02F 3/58* | (2006.01) | |
| *E02F 9/00* | (2006.01) | |
| *F16B 21/02* | (2006.01) | |
| *F16G 15/06* | (2006.01) | |
| *F16B 43/00* | (2006.01) | |

(52) U.S. Cl.
CPC .............. *F16C 11/045* (2013.01); *E02F 3/48* (2013.01); *E02F 3/58* (2013.01); *E02F 9/006* (2013.01); *F16B 21/02* (2013.01); *F16G 15/06* (2013.01); *F16B 43/00* (2013.01)

(58) Field of Classification Search
CPC ... F16C 11/10; F16C 11/04; E02F 3/48; E02F 3/58; E02F 9/006; F16B 21/02; F16B 21/04; F16B 21/16; F16G 15/06
See application file for complete search history.

(56) References Cited

U.S. PATENT DOCUMENTS

| | | | | |
|---|---|---|---|---|
| 3,606,406 A | * | 9/1971 | Walters | ................... F16B 21/02 403/240 |
| 4,335,914 A | | 6/1982 | Korbel | |
| 4,597,499 A | * | 7/1986 | Hanula | .................... B61G 7/10 213/50.5 |
| 5,015,195 A | * | 5/1991 | Piriz | ..................... H01R 13/17 439/272 |

(Continued)

FOREIGN PATENT DOCUMENTS

| | | |
|---|---|---|
| AU | 2008100292 | 5/2008 |
| AU | 2009202213 | 12/2009 |
| GB | 270167 | 5/1927 |

OTHER PUBLICATIONS

ABL Services, Inc., ABL Pins and Keepers, Webpage, downloaded May 26, 2015, 1 page, http://www.abl-services.com/pages/abl-pins-and-keepers.

(Continued)

*Primary Examiner* — Benjamin F Fiorello
(74) *Attorney, Agent, or Firm* — Bart A. Fisher (57) ABSTRACT

A retainer for fastening a pin in a pinned connection is disclosed. The retainer includes an annular first plate having a plurality of first mating features extending inwards from the annular first plate. The retainer also includes an annular compressible section adjacent the annular first plate. The annular compressible section may be coaxially aligned to the annular first plate. The retainer may also include an annular second plate adjacent the compressible section opposite the annular first plate. The annular second plate may be coaxially aligned to the annular first plate and the annular compressible section.

9 Claims, 3 Drawing Sheets

(56) References Cited

U.S. PATENT DOCUMENTS

| | | | |
|---|---|---|---|
| 5,597,260 A | | 1/1997 | Peterson |
| 5,713,765 A | * | 2/1998 | Nugent ................ H01R 13/213 |
| | | | 439/217 |
| 6,921,283 B2 | * | 7/2005 | Zahlit ................ H01R 13/625 |
| | | | 439/286 |
| D581,586 S | * | 11/2008 | Conroy ........................ D26/138 |
| RE42,926 E | * | 11/2011 | Norwood ............. H01R 13/625 |
| | | | 439/314 |
| 8,469,622 B2 | | 6/2013 | McClanahan et al. |
| D753,594 S | * | 4/2016 | Katagiyama ................. D13/133 |
| 9,587,668 B2 | * | 3/2017 | Jia ........................... F16C 11/04 |

OTHER PUBLICATIONS

Columbia Steel, Columbia Steel Mechanical Collar Pins, Webpage, downloaded May 26, 2015, 1 page, http://www.columbiasteel.com/mechanical-collar-pins.html.

Bradken Mining Supply, Dragline Rigging—Harmonise, Webpage, downloaded May 26, 2015, 2 pages, http://bradken.com/our-business/mining-products/getandbuckets/draglinerigging/harmonise.

Bradken Mining Supply, Dragline Rigging—APT Pins, Webpage, downloaded May 26, 2015, 1 page, http://bradken.com/our-business/mining-products/getandbuckets/draglinerigging/apt-pins.

Bradken Ground Engaging Tools, Harmonise, Webpage, downloaded May 26, 2015, 5 pages, http://groundengagingtools.com/harmonise/linkages.html.

Bradken Ground Engaging Tools, APT Dragline Rigging Pins Overview, Webpage, downloaded May 26, 2015, 4 pages, http://groundengagingtools.com/harmonise/pins.html.

Central Queensland Mining Supplies PTY LTD, Sure-Lock Retention System, Apr. 15, 2015, CQMS, Queensland, Australia.

Central Queensland Mining Supplies PTY LTD, Bucket Information CQ115, Product Manual, Apr. 15, 2015, CQMS, Queensland, Australia.

* cited by examiner

PIN AND RETAINER LOCKING SYSTEM

TECHNICAL FIELD

The present disclosure generally pertains to dragline bucket rigging equipment, and is directed toward a pin and retainer locking system for components of the dragline bucket rigging equipment.

BACKGROUND

Dragline bucket rigging equipment can be used for mining applications and general earth moving operations. Dragline bucket rigging equipment generally includes a dragline bucket that engages the ground and excavates soil from the ground. Components of the dragline bucket rigging equipment can be connected by a pin and retainer system.

U.S. Pat. No. 8,469,622 to McClanahan et al. discloses an improved connection system for pinned connections. The connection system may be utilized in dragline excavating systems and a variety of other types of mining, dredging, forestry, and construction equipment. An insert utilized in the connection systems has a frustroconical shape that joins with an aperture in an element being joined by the connection system.

The present disclosure is directed toward overcoming one or more of the problems discovered by the inventors or that is known in the art.

SUMMARY OF THE DISCLOSURE

A retainer for fastening a pin in a pinned connection is disclosed. The retainer includes an annular first plate having a plurality of first mating features extending inwards from the annular first plate. The retainer also includes an annular compressible section adjacent the annular first plate. The compressible section may be composed of a resilient material. The annular compressible section may be coaxially aligned to the annular first plate. The retainer may also include an annular second plate adjacent the compressible section opposite the annular first plate. The annular second plate may be coaxially aligned to the annular first plate and the annular compressible section.

A pin for use in a pinned connection is disclosed. The pin includes a cylindrical body having a first end and a second end opposite the first end. The pin includes a cylindrical surface extending between the first end and the second end. The pin also includes a plurality of multi-directional grooves extending from the first end. Each multi-directional groove may include a guide groove section extending from the first end. The guide groove section may have an axial length. Each multi-directional groove may include a transition section extending from the guide groove section. The transition section may have a first axial end offset from the first end, and have an axial length less than the axial length of the guide groove section. Each multi-directional groove may include a locking groove section extending from the transition section. The locking groove section may have a second axial end offset from the first end, wherein the second axial end may be nearer to the first end than the first axial end of the transition section. The locking groove section may have an axial length greater than the axial length of the transition section.

A pinned connection for a dragline bucket rigging equipment is disclosed. The pinned connection includes a connector. The connector includes a first arm having a first aperture, a second arm spaced apart from the first arm, and the second arm having a second aperture. The first arm and second arm may be joined by an intermediate body. The connector also includes a counterbore extending from the first aperture distal to the second aperture. The pinned connection also includes an end link. The end link includes a third arm inserted between the first arm and second arm of the connector, the third arm having a third aperture. The third aperture may be coaxially aligned with the first and second aperture of the connector. The pinned connection also includes a pin. The pin includes a cylindrical body having a first end and a second end opposite the first end and a cylindrical surface extending between the first end and the second end. The pin also includes a plurality of multi-directional grooves extending from the first end. Each multi-directional groove includes a guide groove section extending from the first end, the guide groove section having an axial length. Each multi-directional groove includes a transition section extending from the guide groove section, wherein the transition section has an axial length less than the axial length of the guide groove section. Each multi-directional groove includes a locking groove section extending from the transition section, wherein the locking groove section has an axial length greater than the axial length of the transition section. The pinned connection also includes a retainer. The retainer includes an annular first plate having a plurality of first mating features extending inwards from the annular first plate. The retainer includes an annular compressible section adjacent the annular first plate. The annular compressible section may be composed of a resilient material. The annular compressible section may be coaxially aligned to the annular first plate. The retainer also includes an annular second plate adjacent the compressible section opposite the annular first plate. The annular second plate may be coaxially aligned to the annular first plate and the annular compressible section.

DETAILED DESCRIPTION

The systems and methods disclosed herein include a pin and retainer assembly for a dragline bucket rigging equipment. The pin and retainer assembly may couple and lock two rigging components together. The pin may include a plurality of multi-directional grooves and the retainer may include a plurality of mating features. The pin and retainer assembly may couple the two rigging components by a coupling process. In addition, the two rigging components may be decoupled by a reverse of the coupling process.

Figure 1:
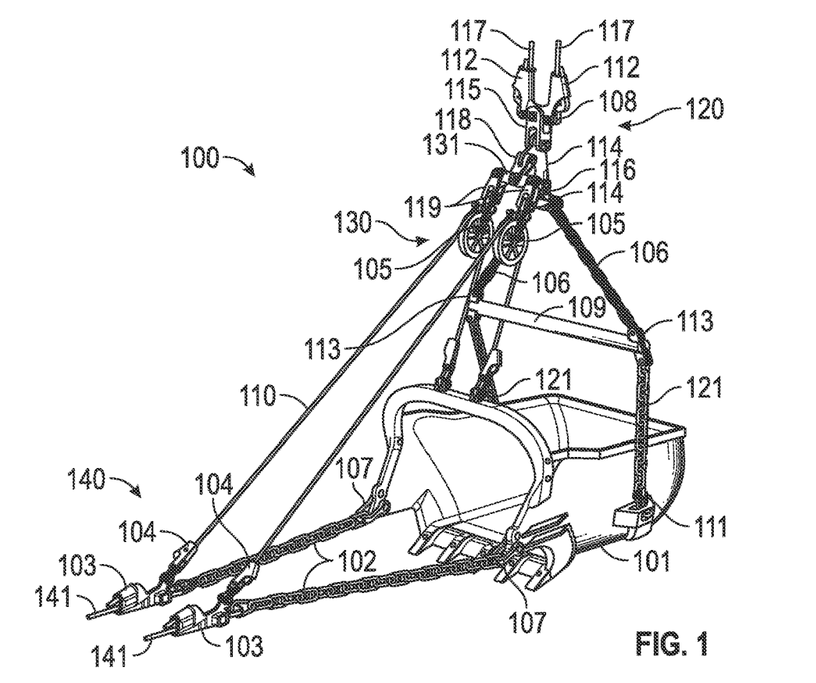
FIG. 1 is a perspective view of a dragline bucket rigging equipment.

FIG. 1 is a perspective view of a dragline bucket rigging equipment 100. Dragline bucket rigging equipment 100 may include a bucket 101, a hoist assembly 120, a dump assembly 130, and a drag assembly 140. Bucket 101 may include a plurality of excavating teeth and an accumulation area.

Hoist assembly 120 may include components which are used to operate equipment such as a pair of hoist ropes 117. In some embodiments, hoist assembly 120 includes said hoist ropes 117, a pair of upper hoist chains 106, a pair of lower hoist chains 121, a pair of trunnion links 111, a hoist equalizer 108, a spreader bar 109, a pair of spreader bar ends 113, a pair of hoist sockets 112, a pick up link 114, a hoist link 115, and a hoist clevis 116.

Dump assembly 130 may include components which are used to operate equipment such as a pair of dump ropes 110. Dump assembly 130 may include said dump ropes 110, a pair of dump sockets 104, a dump link 118, a dump equalizer 131, a pair of block links 119, and a pair of dump blocks 105.

Drag assembly 140 may include components which are used to operate equipment such as a pair of drag ropes 141. Drag assembly 140 may include said drag ropes 141, a pair of drag chains 102, a pair of drag sockets 103, and a pair of drag clevises 107.

Figure 2:
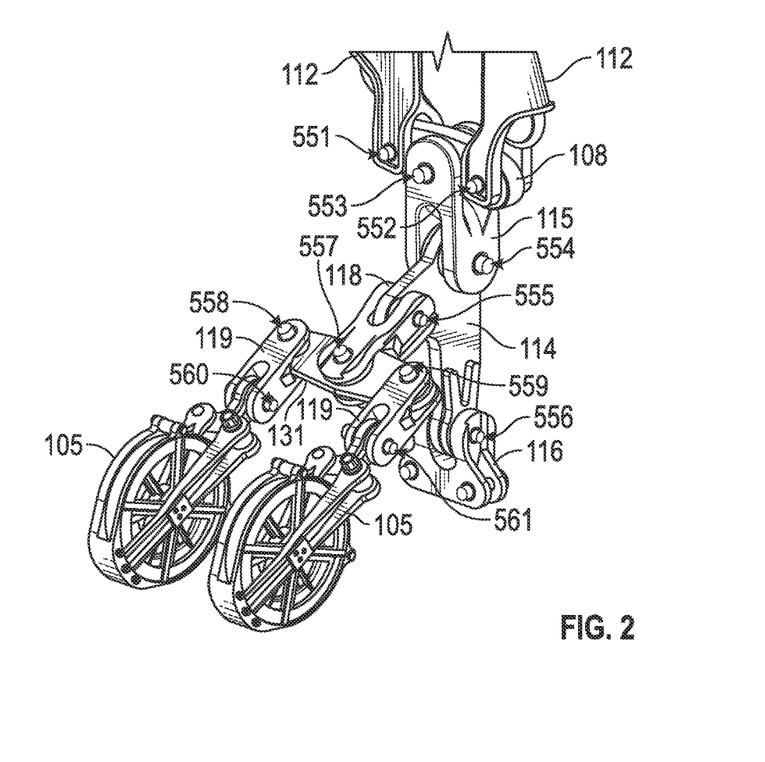
FIG. 2 is an enlarged view of a portion of the dragline bucket rigging equipment of FIG. 1.

Various assemblies and elements of the dragline bucket rigging equipment 100 can be coupled with pinned connections. FIG. 2 is an enlarged view of a portion of the dragline bucket rigging equipment of FIG. 1 showing various examples of pinned connections. For example, a pinned connection 551 may couple hoist equalizer 108 and hoist socket 112 at one end of hoist equalizer 108. A pinned connection 552 may couple another hoist socket 112 to the opposite end of hoist equalizer 108.

A pinned connection 553 may couple hoist equalizer 108 to hoist link 115. In some embodiments, hoist link 115 is referred to as an opposite plane link.

A pinned connection 554 may couple hoist link 115 to pick up link 114. A pinned connection 555 may couple pick up link 114 to dump link 118. Dump link 118 may be an opposite plane link similar to hoist link 115.

A pinned connection 556 may couple pick up link 114 to hoist clevis 116. A pinned connection 557 may couple dump link 118 to dump equalizer 131. Dump equalizer 131 may be similar to hoist equalizer 108.

A pinned connection 558 may couple dump equalizer 131 to block link 119. Block link 119 may be an opposite plane link similar to hoist link 115. A pinned connection 559 may couple another block link 119 to dump equalizer 131.

A pinned connection 560 may couple one of the block links 119 to dump block 105. A pinned connection 561 may couple the other block link 119 to another dump block 105.

Figure 3:
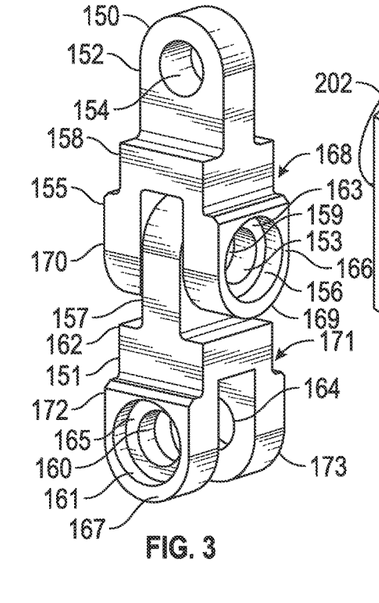
FIG. 3 is a perspective view of an example of two components of a dragline bucket rigging equipment.

FIG. 3 is a perspective view of an example of two pinned coupling components of a dragline bucket rigging equipment. The two pinned coupling components may be referred to as a first rigging component 150 and a second rigging component 151. In the embodiment shown, first rigging component 150 may include two sections: a connector 168 and an end link 152. Connector 168 may include a first arm 169 having an aperture 153 extending through first arm 169, a second arm 170 having an aperture 155 extending through second arm 170 (not clearly shown), and an intermediate platform (sometimes referred to as intermediate body) 158 joining first arm 169 and second arm 170. First arm 169 may be spaced apart from second arm 170. In some embodiments, first arm 169, second arm 170, and intermediate platform 158 form a U-shaped bracket. In some embodiments, first arm 169 and second arm 170 are parallel to one another, and aperture 153 and aperture 155 are aligned to the same axis.

In some embodiments, a counterbore may extend from each of apertures 153 and 155. For instance, a counterbore 156 may extend from an end surface 163 of aperture 153 to an outer surface 166 of first arm 169. In some embodiments, counterbore 156 extends from aperture 153 in a direction distal to aperture 155. Counterbore 156 may have a larger diameter than aperture 153.

End link 152 may include an arm member extending from intermediate platform 158 in a direction opposite from first arm 169 and second arm 170. In some embodiments, end link 152 has an aperture 154. In some embodiments, end link 152 is angled orthogonal to both first arm 169 and second arm 170.

Second rigging component 151 may also include two sections: a connector 171 and an end link 157. Similar to end link 152, end link 157 may include an arm member extending from an intermediate platform (sometimes referred to as intermediate body) 162. End link 157 may have an aperture 159 similar to aperture 154 in end link 152.

In the embodiment shown in the figure, end link 157 of second rigging component 151 is inserted into connector 168 of first rigging component 150. In particular, end link 157 of second rigging component 151 may be positioned between first arm 169 and second arm 170 of first rigging component 150. Furthermore, aperture 159 of end link 157 may be aligned with apertures 153 and 155 of connector 168 to receive a pin.

Similar to connector 168 of first rigging component 150, connector 171 may include a first arm 172 having an aperture 160, a second arm 173 having an aperture 164, and intermediate platform 162 joining first arm 172 and second arm 173. First arm 172 and second arm 173 may be spaced apart. In some embodiments, first arm 172, second arm 173, and intermediate platform 162 form a U-shaped bracket. In some embodiments, first arm 172 and second arm 173 are parallel to one another, and aperture 160 and aperture 164 are aligned to the same axis. In some embodiments, a counterbore may extend from each of apertures 160 and 164. For instance, a counterbore 161 may extend from an end surface 165 of aperture 160 to an outer surface 167 of first arm 172. Counterbore 161 may have a larger diameter than aperture 160.

In embodiments, end link 152 of first rigging component 150 may be replaced by a connector. In other embodiments, end link 152 may be replaced by a section not designed to be part of a pinned connection. For example, end link 152 may be replaced by an elongated hollow socket such as in hoist socket 112 of FIG. 2, or a U-shaped member such as in hoist clevis 116 of FIG. 2.

In embodiments, connector 171 of second rigging component 151 may be replaced by an elongated member section such as in hoist equalizer 108 of FIG. 2. In some embodiments, hoist equalizer 108 of FIG. 2 includes three end links. Connector 171 of second rigging component 151 may be replaced by an L-shaped member such as in pick up link 114. In other embodiments, connector 171 of second rigging component 151 may be replaced by a section not designed to be part of a pinned connection. For example, end link 152 may be replaced by a rotatable sheave such as in dump block 105 of FIG. 2.

Figure 4:
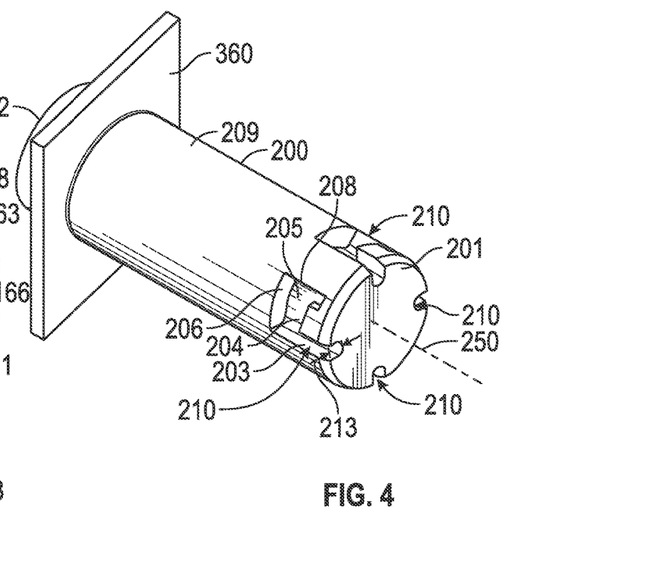
FIG. 4 is a perspective view of a pin for a dragline bucket rigging equipment.
Figure 5:
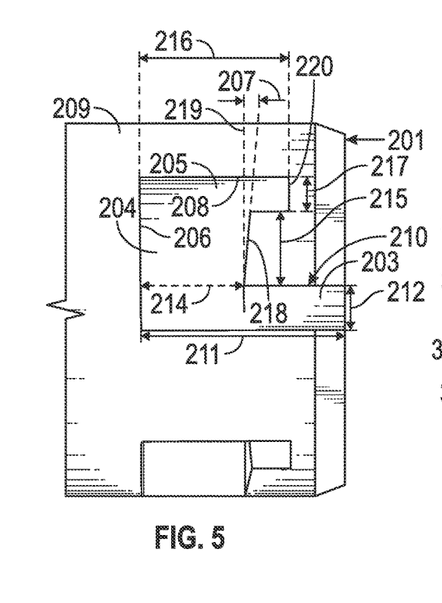
FIG. 5 is a top plan view of a portion of the pin of FIG. 4 showing a multi-directional groove.

FIGS. 4 and 5 are a perspective and top view of a pin 200 for a dragline bucket rigging equipment, respectively. Pin 200 may be an elongated cylindrical body having a first end 201, a second end 202, and a cylindrical surface 209 extending between first end 201 and second end 202. Pin 200 may generally revolve about an axis 250. Axis 250 may be a central axis of pin 200. All references to radial, axial, and circumferential directions and measures with reference to pin 200 refer to axis 250 and terms such as "inner" and "outer" generally indicate a lesser or greater radial distance from axis 250.

In some embodiments, pin 200 may have a diameter of three inches to twelve inches. However, pin 200 may be any size as desirable for its intended purpose.

Pin 200 may include a plurality of multi-directional grooves 210 located at one end of pin 200. In particular embodiments, each multi-directional groove 210 includes three sections: a guide groove 203, a transition section 204, and a locking groove 205. As shown, each multi-directional groove 210 may form a shape of a "J,", and may hereinafter be referred to as "J-slots." In other embodiments, not shown, each multi-directional groove 210 may form a shape of a backwards "J", and may also be referred to as "J-slots".

As shown in FIG. 5, guide groove 203 may extend in an axial direction along cylindrical surface 209 from first end 201. In some embodiments, guide groove 203 extends an axial length 211 of 1 to 3 inches from first end 201. Guide groove 203 may have an arc length 212 of 0.25 to 0.75 inch and a depth 213 of 0.25 to 1 inch. In some embodiments, the depth 213 is constant throughout multi-directional groove 210. In other embodiments, the depth 213 may vary in certain sections of multi-directional groove 210. The axial end of guide groove 203 may define an inner wall 206.

Transition section 204 may extend in a circumferential direction about cylindrical surface 209 from a portion of guide groove 203. In some embodiments, transition section 204 defines a rectangular shaped passage through cylindrical surface 209. In some embodiments, transition section 204 defines a cylindrical shaped passage through cylindrical surface 209. In some embodiments, transition section 204 has a first axial end 218 offset from first end 201. Transition section 204 may have an axial length 214 less than the axial length 211 of guide groove 203. In some embodiments, axial length 214 is 20% to 50% of axial length 211. In some embodiments, transition section 204 extends an arc length 215 of 1 to 4 inches from guide groove 203.

Locking groove 205 may extend in a circumferential direction about cylindrical surface 209 from transition section 204. In some embodiments, locking groove 205 has a second axial end 220 offset from first end 201. Furthermore, second axial end 220 may be nearer to first end 201 than first axial end 218 of transition section 204. In some embodiments, locking groove 205 has an axial length 216 greater than axial length 214 of transition section 204. In some embodiments, axial length 216 is about 75% of axial length 211. Furthermore, locking groove 205 may have an arc length 217 of 0.25 to 0.75 inch. In some embodiments, arc length 217 of locking groove 205 is the same as arc length 212 of guide groove 203. In some embodiments, arc length 217 of locking groove 205 is less than arc length 212 of guide groove 203. The circumferential end of locking groove 205 may define a circumferential wall 208.

As shown in FIG. 4, each multi-directional groove 210 may be circumferentially spaced apart from one another. In some embodiments, each multi-directional groove 210 is equidistantly spaced apart from one another. In certain embodiments, pin 200 includes at least two multi-directional grooves 210. In certain embodiments, pin 200 includes at least four multi-directional grooves 210. In certain embodiments, pin 200 includes at least six multi-directional grooves 210. In certain embodiments, pin 200 includes at least eight multi-directional grooves 210.

As shown in FIG. 5, first axial end 218 may be a slanted wall. Slanted wall 218 may be located opposite inner wall 206. In some embodiments, slanted wall 218 is oriented at an angle 207 offset from a plane 219, in which plane 219 is parallel to the axial plane of inner wall 206. In certain embodiments, angle 207 is 5-15° offset from plane 219. In some embodiments, axial length 214 of transition section 204 gradually increases in length from guide groove section 203 to locking groove section 205.

In certain embodiments as shown in FIG. 4, the opposite end of pin 200 from the plurality of multi-directional grooves may include a welded retainer 360. Welded retainer 360 may be welded to the end of pin 200. In some embodiments, welded retainer 360 is a square retainer. In some embodiments, welded retainer 360 may be any shape.

Figure 6:
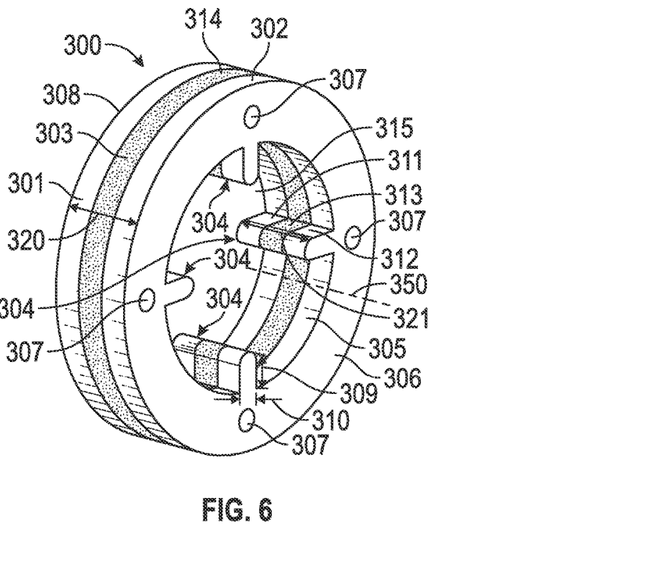
FIG. 6 is a perspective view of a retainer for a dragline bucket rigging equipment.

FIG. 6 is a perspective view of a retainer 300 for a dragline bucket rigging equipment. In some embodiments, retainer 300 is an annulus featuring three sections: a first plate 301, a second plate 302, and a compressible section 303. Each section may be annular. Retainer 300 may generally revolve about an axis 350. Axis 350 may be a central axis of retainer 300. All references to radial, axial, and circumferential directions and measures with reference to retainer 300 refer to axis 350 and terms such as "inner" and "outer" generally indicate a lesser or greater radial distance from axis 350.

First plate 301 may be adjacent to compressible section 303. Second plate 302 may be adjacent compressible section 303 opposite from first plate 301. In certain embodiments, compressible section 303 has two opposite faces in which one face is bonded to first plate 301 and the other face is bonded to second plate 302. In certain embodiments, compressible section 303 is bonded to first plate 301 and second plate 302 by adhesives, vulcanization, or fasteners.

First plate 301, second plate 302, and compressible section 303 may each have a thickness. The combined thicknesses of first plate 301, second plate 302, and compressible section 303 define an axial length 320. In some embodiments, axial length 320 is 0.25 to 2.0 inches. First plate 301 and second plate 302 may each have a thickness of 25% to 40% of axial length 320. Compressible section 303 may have a thickness of 25% to 40% of axial length 320.

Retainer 300 may have a first outer surface 306 and a second outer surface 308 opposite first outer surface 306. As shown, first outer surface 306 may be the outward facing end of second plate 302. Although not clearly shown in the figure, second outer surface 308 may be the outward facing end of first plate 301. Retainer 300 may also have an outer cylindrical surface 314 and an inner cylindrical surface 305, where both outer cylindrical surface 314 and inner cylindrical surface 305 extends between first outer surface 306 and second outer surface 308. Inner cylindrical surface 305 may also be cylindrical and may define a central aperture 315 of retainer 300. Outer cylindrical surface 314 may be a merged outer surface of the outer surfaces of each of first plate 301, second plate 302, and compressible section 303. Inner cylindrical surface 305 may be a merged inner surface of the inner surfaces of each of first plate 301, second plate 302, and compressible section 303.

In some embodiments, first outer surface 306 includes a plurality of holes 307. The plurality of holes 307 may be equidistantly spaced apart in a circumferential direction about axis 250.

In some embodiments, first plate 301 has a plurality of first mating features 311. In some embodiments, second plate 302 has a plurality of second mating features 312. In some embodiments, compressible section 303 has a plurality of third mating features 313. The plurality of first mating features 311, the plurality of second mating features 312, and the plurality of third mating features 313 may align to form a plurality of mating features 304. In certain embodiments, each mating feature 304 is a rounded protrusion extending an axial length 321 from first outer surface 306 to second outer surface 308. Each first mating feature 311, each second mating feature 312, and each third mating feature 313 may also be a rounded protrusion. Axial length 321 of each mating feature 304 may be the same as axial length 320 of retainer 300. Each mating feature 304 also extends in a radial direction from inner cylindrical surface 305.

Each mating feature 304 may have a height 309 of 0.20 inch to 1 inch. In some embodiments, height 309 may be 85% to 98% of depth 213 of multi-directional groove 210. Each mating feature 304 may have a width 310 of 0.20 inches to 0.75 inches. In some embodiments, width 310 may be 85% to 98% of arc length 212 of multi-directional groove 210. Height 309 may be the radial length from inner cylindrical surface 305 to the end of the mating feature. The plurality of mating features 304 may be equidistantly spaced from one another in a circumferential direction about axis 350. As shown, retainer 300 may include at least four mating features 304. In some embodiments, retainer 300 includes at least two mating features 304. In some embodiments, retainer 300 includes at least six mating features 304. In some embodiments, retainer 300 includes at least eight mating features 304.

In particular embodiments, first plate 301 and second plate 302 are composed of metal, such as steel. Compressible section 303 may be composed of a resilient material. Compressible section 303 may be composed of a compressible or biasing element. In some embodiments, the biasing element is at least one of rubber, urethane, thermoplastic elastomer, or similar elastomeric materials. In some embodiments, compressible section 303 is a spring.

Figures 7, 8, 9, 10:
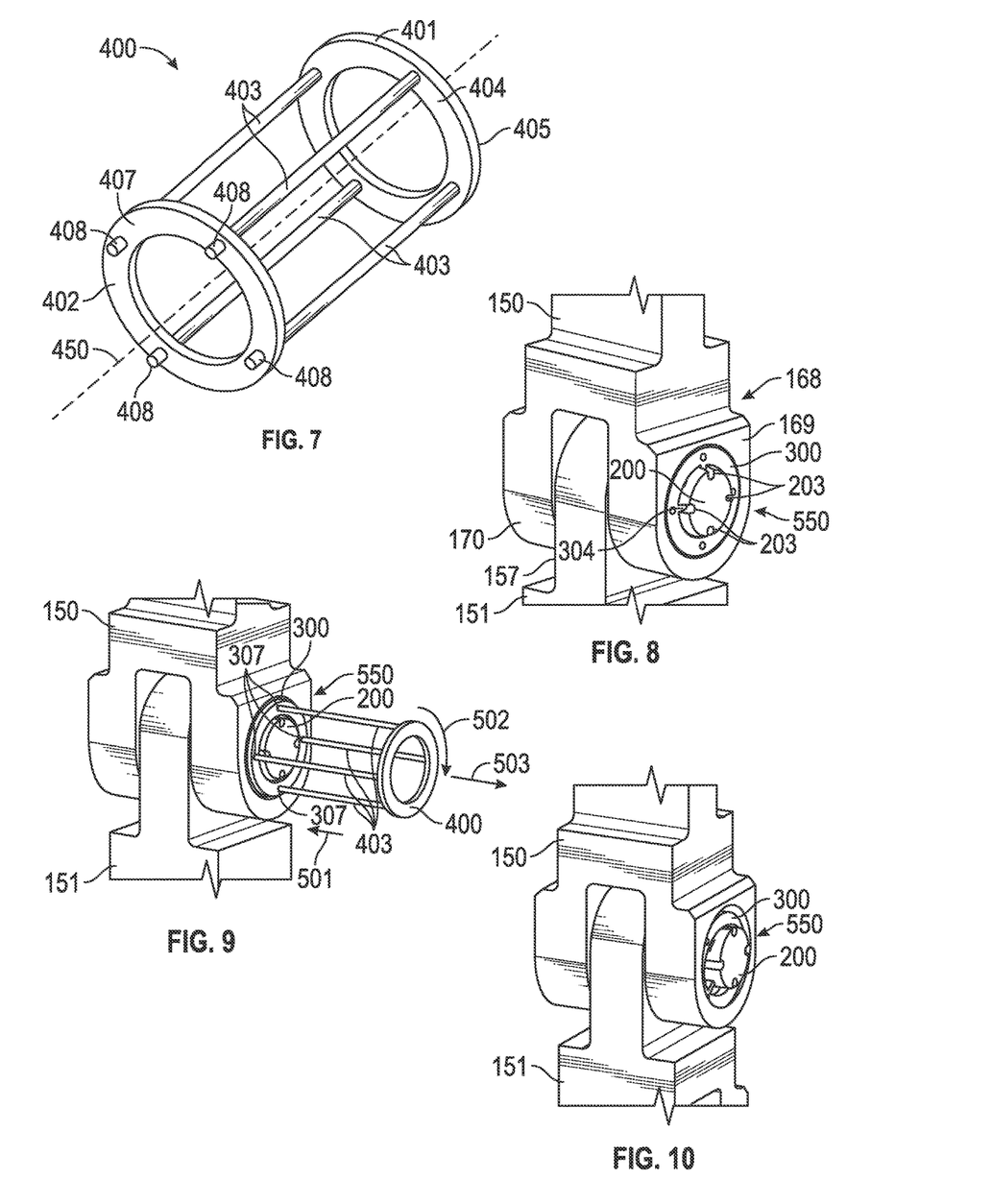
FIG. 7 is a perspective view of a tool for a pin and retainer locking system for a dragline bucket rigging equipment.
FIG. 8 is a perspective view of a pin and retainer assembly inserted in the two components of FIG. 3.
FIG. 9 is a perspective view of a coupling process to lock the two components of FIG. 3 using the pin and retainer assembly of FIG. 8 and the tool of FIG. 7.
FIG. 10 is a perspective view of the two components of FIG. 3 locked together by the locking process of FIG. 9.

FIG. 7 is a perspective view of a tool 400 for a pin and retainer locking system for a dragline bucket rigging equipment. In particular embodiments, tool 400 includes a first tool end 401 and a second tool end 402 located opposite from first tool end 401. First tool end 401 and second tool end 402 may be plates composed of metal, such as steel. Tool 400 may generally revolve about an axis 450. Axis 450 may be a central axis of tool 400. All references to radial, axial, and circumferential directions and measures with reference to tool 400 refer to axis 450 and terms such as "inner" and "outer" generally indicate a lesser or greater radial distance from axis 450.

First tool end 401 may have an inner surface 404 and an outer surface 405 located opposite from inner surface 404. Likewise, second tool end 402 may have an inner surface 406 and an outer surface 407 located opposite from inner surface 406. As shown, a plurality of rods 403 may join first tool end 401 and second tool end 402. Tool 400 may include at least four rods 403. Each rod 403 may be circumferentially spaced from one another about axis 450.

In some embodiments, each rod 403 extends from inner surface 404 of first tool end 401 through inner surface 406 and outer surface 407 of second tool end 402. A portion of each rod 403 may extend past outer surface 407 of second tool end 402, forming a pin 408. Thus, tool 400 may include a plurality of pins 408 spaced circumferentially about second tool end 402.

In some embodiments, tool 400 includes a handle attached to first tool end 401 (not shown). The handle may provide an additional holding surface for operation of tool 400.

In some embodiments, each rod 403 extends outwards from outer surface 407 of second tool end 402. In such embodiments, the opposite end of second tool end 402 may have a handle. Furthermore, the handle may be in the form of a T.

FIGS. 8-10 are perspective views of a pinned connection 550 using pin 200 of FIG. 4 and retainer of FIG. 5 for the two pinned coupling components of FIG. 3. As shown in FIG. 8, pin 200 may be inserted through the apertures of arm 169 and arm 170 of first rigging component 150 and the center aperture of end link 157 of second rigging component 151. Retainer 300 may be positioned around pin 200 and within counterbore 156 (shown in FIG. 3). Although not clearly shown, the plurality of mating features 304 (shown in FIG. 5) of retainer 300 may be inserted into the plurality of guide grooves 203 of pin 200. Each mating feature 304 may be pushed through one of the guide grooves 203 until the end of each mating feature 304 contacts inner wall 206 (shown in FIG. 4) of the respective guide groove 203.

As shown in FIG. 9, tool 400 of FIG. 7 may be used to lock retainer 300 to pin 200. The plurality of rods 403 may be used as alignment guides to align tool 400 to retainer 300. As described in FIG. 7 above, each rod 403 may extend past outer surface 407 of second tool end 402 to form a pin 408. In certain embodiments, the plurality of pins 408 may be inserted into one of the plurality of holes 307 of retainer 300.

In a first step, tool 400 may be pushed in a direction of arrow 501. By pushing tool 400 in this direction, retainer 300 may be pushed towards end surface 163 of aperture 155 (shown in FIG. 3) of first rigging component 150. In some embodiments, this step compresses compressible section 303 of retainer 300 into a compressed state, which reduces axial length 320 of retainer 300. As a result, each mating feature 304 of retainer 300 is also compressed and has a reduced axial length 321. In some embodiments, the reduced length of axial length 321 may be equal or less than axial length 214 of transition section 204 (shown in FIG. 5).

In a second step, tool 400 may be rotated in a clockwise direction indicated by arrow 502. By rotating tool 400 in this direction, retainer 300 may be rotated about pin 200. In particular, each mating feature 304 of retainer 300 may be rotated about one of the transition sections 204 into the adjoining locking groove 205. In particular embodiments, each mating feature 304 is rotated in a clockwise direction until each mating feature 304 contacts the circumferential wall 208 of the respective locking groove 205.

In a third step, tool 400 may be pulled in a direction of arrow 503. By pulling tool 400 in this direction, tool 400 may be disengaged from retainer 300. As a result, retainer 300 may be less compressed or may no longer be compressed. In particular embodiments, axial length 320 of retainer 300 may return to its original or neutral state. In other embodiments, axial length 320 of retainer 300 may be in a slightly compressed state. Moreover, each mating feature 304 may decompress and expand within locking groove 205. Axial length 321 of each mating feature 304 may be equal to or less than axial length 216 of the respective locking groove 205. Additionally, axial length 321 of each mating feature 304 may be greater than axial length 214 of the respective transition section 204.

As shown in FIG. 10, first rigging component 150 and second rigging component 151 may be coupled and locked together by pin 200 and retainer 300. In certain embodiments, a square retainer may be welded to the opposite end of pin 200 from retainer 300 (not shown). This may aid in fastening both ends of pin 200 to first rigging component 150 and second rigging component 151.

Although not shown, the steps illustrated in FIG. 9 may be performed in reverse to disassemble retainer 300 from pin 200. In addition, in embodiments where transition section 204 features a slanted wall 218, the slanted wall 218 may provide additional surface contact and resistance to prevent retainer 300 from unintentionally compressing and sliding out of the locking groove 205 and the transition section 204.

INDUSTRIAL APPLICABILITY

A dragline bucket rigging equipment can be used for mining applications and general earth moving operations. Dragline bucket rigging equipment may include a bucket and an accumulation area. The plurality of excavating teeth engages the ground to displace earth such as soil, dirt, rocks, and the like. The displaced earth may then be collected in the accumulation area. Furthermore, the displaced earth, sometimes known as overburden, may be displaced to uncover ore, minerals, metals, or the like. Various components of the dragline bucket rigging equipment are commonly coupled together by a pinned connection. Pinned connections typically involve a pin and welded retainers. Pinned connections between the various components of the dragline bucket rigging equipment may experience wear in areas where surfaces of the components bear against each other and are subjected to tensile, compressive, abrasive, or various other forces. Given the effects of the abrasion and stresses, the various components of the dragline bucket rigging equipment are subject to maintenance, which may involve inspecting, disassembling, repairing, and/or replacing the components. The dragline bucket rigging equipment is usually halted during maintenance, which has a limiting effect upon the overall efficiency of the equipment. In order to inspect, repair, or replace pinned connections, it is common for the welded retainers to be removed to provide access to the pin, which typically involves cutting at least one of the welded retainers with a welding torch.

A pin and retainer assembly, such as pin and retainer assembly 500, may provide a quicker and more cost efficient method of coupling two rigging components of the draggling bucket rigging equipment. For instance, pin and retainer assembly 500 may include pin 200 and retainer 300. Pin 200 may include a plurality of multi-directional grooves 210 and retainer 300 may include a plurality of mating features 304. Mating features 304 may be inserted into multi-directional grooves 210 and rotated about multi-directional grooves 210. A tool, such as tool 400, may be used to push and rotate mating features 304 about multi-directional groove 210. In other embodiments, a tool such as a hydraulic cylinder having a cylindrical ram end may be used to compress and turn retainer 300. In such embodiments, the cylindrical ram end may have an adapter configured to mate with the retainer. An additional fixture may be used to hold the hydraulic cylinder in place. Mating features 304 may be rotated into a final locking position that locks mating features 304 into multi-directional groove 210, and thus couple the two rigging components of draggling bucket rigging equipment together.

This coupling process can be performed quickly and can lessen the total assembly time. Additionally, the process can be performed in reverse to disassemble retainer 300 from pin 200, and thus de-couple the two components. The decoupling process can also be performed quickly and can lessen the total maintenance time.

The preceding detailed description is merely exemplary in nature and is not intended to limit the invention or the application and uses of the invention. The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A retainer for fastening a pin in a pinned connection, the retainer comprising:
an annular first plate having a plurality of first mating features extending inwards from the annular first plate;
an annular compressible section adjacent the annular first plate, the annular compressible section composed of a resilient material, the annular compressible section coaxially aligned to the annular first plate; and
an annular second plate adjacent the compressible section opposite the annular first plate, the annular second plate coaxially aligned to the annular first plate and the annular compressible section wherein the annular second plate has a plurality of second mating features, and the annular compressible section has a plurality of third mating features, wherein the plurality of first mating features, the plurality of second mating features, and the plurality of third mating features are circumferentially aligned, and wherein each first mating feature, each second mating feature, and each third mating feature is a rounded protrusion.

2. The retainer of claim 1, wherein the plurality of first mating features are equidistantly spaced apart from one another in a circumferential direction.

3. The retainer of claim 1, further comprising a plurality of holes located in an outward facing end of the first annular plate.

4. The retainer of claim 1, wherein the compressible section includes a biasing element selected from one or more of: rubber, polyurethane, elastomer, and spring.

5. A pinned connection for a dragline bucket rigging equipment, the pinned connection comprising:
a connector including
a first arm having a first aperture, a second arm spaced apart from the first arm, the second arm having a second aperture, the first arm and second arm joined by an intermediate body,
a counterbore extending from the first aperture distal to the second aperture;
an end link including
a third arm inserted between the first arm and second arm of the connector, the third arm having a third aperture, the third aperture coaxially aligned with the first and second aperture of the connector;
a pin including
  a cylindrical body having a first end and a second end opposite the first end, and a cylindrical surface extending between the first end and the second end,
  a plurality of multi-directional grooves extending from the first end, each multi-directional groove including
    a guide groove section extending from the first end, the guide groove section having an axial length,
    a transition section extending from the guide groove section, the transition section having an axial length less than the axial length of the guide groove section, and
    a locking groove section extending from the transition section, the locking groove section having an axial length greater than the axial length of the transition section wherein the transition section gradually increases in axial length from the guide groove section to the locking groove section; and
a retainer including
  an annular first plate having a plurality of first mating features extending inwards from the annular first plate;
  an annular compressible section adjacent the annular first plate, the annular compressible section composed of a resilient material, the annular compressible section coaxially aligned to the annular first plate; and
  an annular second plate adjacent the compressible section opposite the annular first plate, the annular second plate coaxially aligned to the annular first plate and the annular compressible section.

6. The pinned connection of claim 5, wherein a plurality of rounded protrusions in a neutral state has an axial length greater than the axial length of the transition section.

7. The pinned connection of claim 5, wherein a plurality of rounded protrusions in a compressed state has an axial length equal to or lesser than the axial length of the transition section.

8. The pinned connection of claim 5, wherein each of a plurality of rounded protrusions is guided through one of the guiding groove sections, compressed and rotated within one of the transition sections, and expanded within one of the locking groove sections.

9. The pinned connection of claim 5, wherein the first plate and second plate are composed of metal, and the compressible section includes a biasing element selected from one or more of: rubber, polyurethane, elastomer, and spring.

* * * * *